United States Patent [19]

Newman

[11] 4,260,303
[45] Apr. 7, 1981

[54] BORING TOOLS

[76] Inventor: John M. W. Newman, Wells House, Parsonage La., Farnham Common, Buckinghamshire, England

[21] Appl. No.: 38,417

[22] Filed: May 11, 1979

[51] Int. Cl.$^3$ .............................................. B23B 51/00
[52] U.S. Cl. ................................... 408/168; 408/181; 408/240; 279/1 A
[58] Field of Search ............... 408/153, 157, 158, 163, 408/168, 169, 170, 171, 172, 226, 238, 239, 240; 279/1 A, 8

[56] References Cited

U.S. PATENT DOCUMENTS

| 375,361 | 12/1887 | Kingman | 408/157 |
| 1,217,256 | 2/1917 | Witanowski | 408/168 X |
| 2,046,241 | 6/1936 | Beard | 408/161 X |
| 2,272,200 | 2/1942 | Hogg | 408/171 |

FOREIGN PATENT DOCUMENTS 133442  7/1949  Australia ................................ 408/226

Primary Examiner—W. Donald Bray
Attorney, Agent, or Firm—Fay & Sharpe

[57] ABSTRACT

A boring tool has a cylindrical body (1) with cutter blades (7) slidable at an angle to the body axis. The projection of the blades beyond the body and thus the boring diameter is set by a rotatable advancing member (12) having a conical head (11) to engage the blades and a threaded shank (13) within a threaded portion (14) in the body. Rotation of the member (12) is produced by rotation of a worn (17) engaging a worm wheel (16) fast to the shank.

8 Claims, 3 Drawing Figures

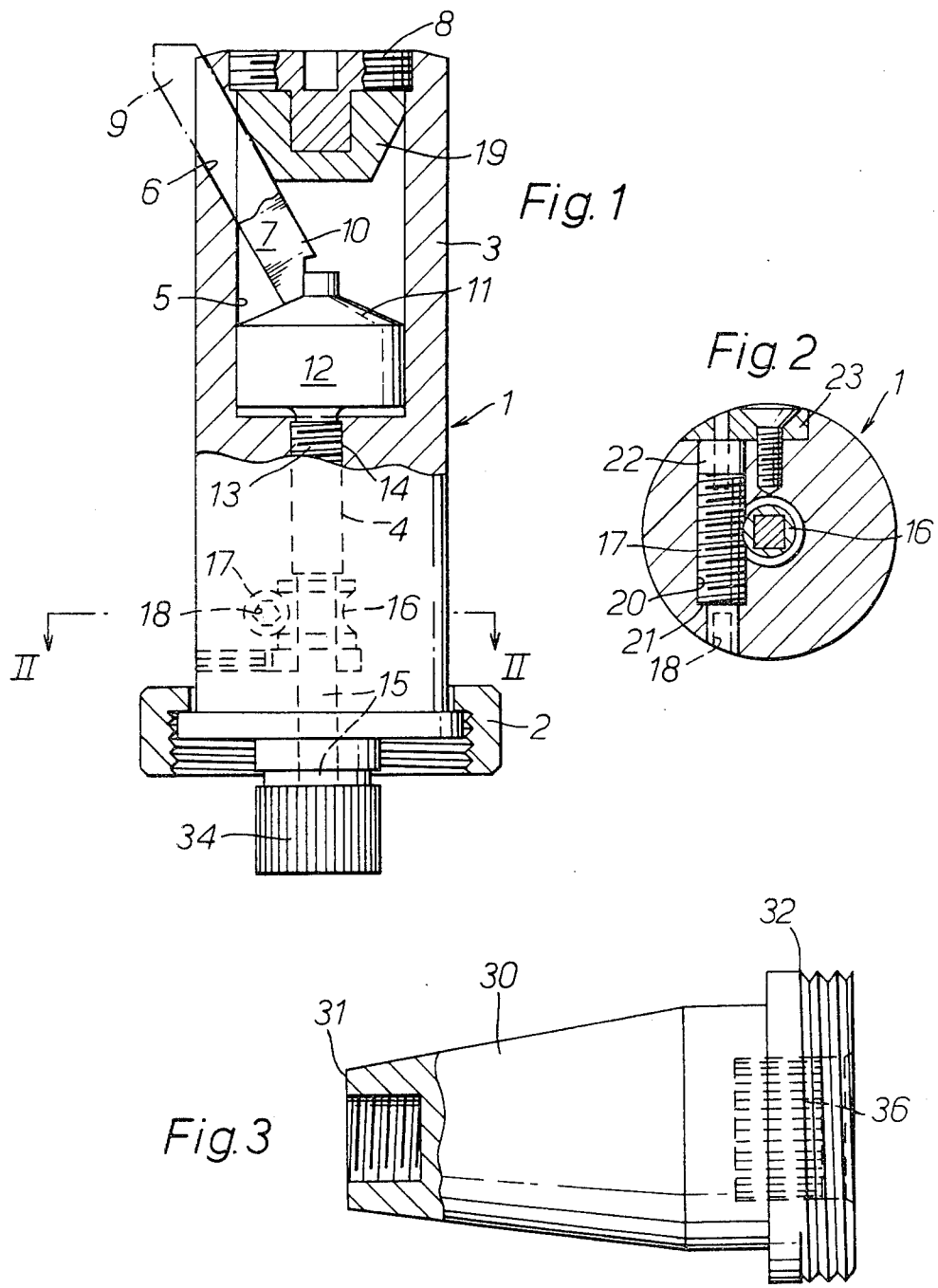

BORING TOOLS

This invention relates to boring tools in which the cutting diameter can be adjusted.

In accordance with the invention, a boring tool comprises a body, a plurality of cutting blades supported by the body so as to be movable along paths equally inclined at an acute angle to an axis of rotation, outer ends of the blades having cutting edges projecting beyond the body, a blade advancing member having a screwed shank within a threaded bore on the axis of rotation and a head abutting inner ends of the blades for advancing and retracting the blades in their paths consequent upon rotation of the shank within the bore, and means operable from the exterior of the body for causing rotation of the blade advancing member.

Preferably the said means for causing rotation of the blade advancing member comprises a worm adapted means, for example a socket, for rotation by a removable key or handle, and a meshing worm wheel secured to a shaft extending from the blade advancing member shank and coaxial therewith.

An embodiment of the invention will now be more fully described, by way of example, with reference to the attached drawing wherein:

FIG. 1 shows a longitudinal section of the boring tool,

FIG. 2 shows a section on the line II—II in FIG. 1, and

FIG. 3 shows an elevation of an adaptor.

The tool shown in FIGS. 1 and 2 of the drawings comprises a cylindrical body 1 which comprises a ring nut 2 at one end, for mounting in an adaptor to be later described so that the tool may be connected to a chuck or drive means of a drilling or boring machine for rotation about its cylindrical axis. A bore 4 extends longitudinally through the body and is widened at the other end 3 of the body to form a cylindrical cavity 5. A plurality of straight holes 6 of circular cross-section are formed at the end 3 of the body through the cavity wall, each hole lying at an acute angle to the body axis. The holes are equispaced to form slideways for at least three or four cutter blades 7 (only one being shown in FIG. 1) which are retained by a screwed end plug 8 which backs a pressure pad 19 within the cavity and having a coned surface to guide the blades. The outer ends 9 of the blades, which project beyond the body are ground to provide cutting edges and the inner ends 10 of the blades abut a conical surface of a head 11 of a blade advancing member 12. To prevent the blades rotating in the holes, each has a longitudinal flat formed on its surface to engage the coned surface of the pressure pad.

The head 11 of the member 12 is carried on one end of a screwed shank 13 mounted within a threaded portion 14 of the bore 4. The other end of the shank carries a square-section shaft 15 having a diagonal dimension less than the bore diameter. The shank carries a worm wheel 16 slidable thereon and meshing with a worm 17 rotatably carried in an open ended drilling 20 in the body on an axis at right angles to the axis of rotation of the body. The worm has a socket 18 in its spindle to receive a removable key (not shown) by means of which it can be rotated. To locate the worm axially the drilling has a shoulder 21 at one end and is provided with a bush 22 at the other end secured by a retainer 23.

Rotation of the worm by the key causes corresponding rotation of the worm wheel, and thus the shaft of the member 12 resulting in axial movement of the head 11 to advance or retract the blades equally. Thus the diameter of a hole cut by the blades during rotation of the tool can be adjusted accurately and to within fine limits.

In one example of such a tool the shank 13 is screwed 20 T.P.I., the worm wheel has 25 teeth and the worm is threaded 20 T.P.I. In this example, one complete rotation of the worm causes a variation in the blade setting diameter of 0.025" so that a variation of as little as 0.00025" can be achieved. Moreover, the worm gearing produces a mechanical advantage which locks the setting and prevents a loss of adjustment when the teeth are under load.

To ensure that the blades follow the head on retraction, biassing means such as springs can be incorporated to urge the blades inwardly.

The tool adaptor 30 as shown in FIG. 3 is largely of frusto-conical shape and at its smaller end 31 is internally threaded for mounting on the shaft of a power tool. At its large end, the surface 32 of the adaptor is of cylindrical shape and is screw threaded to engage the ring nut 2 on the tool. A knurled or serrated spigot 34 on the tool engages within a similarly knurled or serrated cylindrical recess 36 in the larger end of the adaptor to provide a positive rotational drive from the adaptor to the tool.

What is claimed is:

1. A boring tool comprising: a body; a plurality of cutting blades having blade outer ends with cutting edges; said blades being supported by said body adjacent one end thereof with said cutting edges projecting outwardly beyond said body and being movable outwardly and inwardly relative to said body for varying the diameter of a hole bored by said blades; a generally cylindrical cavity in said one end of said body; a blade advancing member having an enlarged head positioned in said cavity; said blades having blade inner ends engaging said head; said body having an axial threaded bore extending inwardly from said cavity; said blade advancing member further having an elongated threaded shank including opposed ends with said shank threadedly engaging said threaded bore for moving said head longitudinally of said body upon rotation of said shank said head being positioned on one end there of; said blade advancing member having an elongated axial shaft portion of non-circular cross-sectional shape on the opposite end of said threaded shank from said head; a rotatable worm wheel received on said shaft portion for rotatably driving said shaft portion upon rotation of said worm wheel and while providing longitudinal sliding movement of said shaft portion relative to said worm wheel; and, a worm gear rotatably mounted in said body transversely of the longitudinal axis thereof and drivingly engaging said worm wheel.

2. The tool of claim 1 wherein said body has an opposite end; a serrated drive spigot extending axially outwardly of said opposite end; and, a ring nut on said body adjacent said one end thereof for securing said body to a drive adaptor.

3. The tool of claim 2 including a drive adaptor having a serrated drive socket receiving said drive spigot and having a threaded end received in said ring nut for securing said adaptor to said opposite end of said body, and said adaptor having a threaded hole opposite from said drive socket for receiving a threaded end of a power tool shaft.

4. The tool of claim 1 wherein each said blade extends at an acute angle to the longitudinal rotational axis of said body such that movement of said blades includes components both along and radial of said axis, said body having blade receiving holes adjacent said one end thereof, said cavity extending inwardly of said body through an enlarged opening at said one end thereof, said body having internal threads around said opening, a threaded plug engaging said internal threads for closing said opening, and a pressure pad interposed between said plug and blades for holding said blades in adjusted position.

5. A boring tool comprising: a body having a longitudinal rotational axis; an enlarged generally cylindrical cavity extending into said body through an enlarged internally threaded opening at one end thereof; a plurality of circumferentially-spaced cutting blade receiving holes extending through said body adjacent said one end thereof at acute angles to said body axis for receiving cutting blades movable outwardly and inwardly relative to said body with movement components extending both along and radially of said axis; cutting blades received in said holes and having outer ends with cutting edges extending beyond said body and having blade inner ends extending into said cavity; a cutting blade adjusting device including an enlarged head received in said cavity and having a generally conical surface portion engaging said blade inner ends; a threaded plug closing said opening and having a pressure pad interposed between said blades and said plug, said plug urging said pad into firm engagement with said blades for locking same in adjusted position; a threaded bore in said body on the opposite side of said head from said plug and pad; a threaded shank extending from said head and being threaded in said bore so that rotation of said shank moves said head longitudinally to adjust the projecting distance of said cutting edges beyond said body; a worm wheel rotatable in said body and rotatably drivingly engaging said shank; and, a rotatable worm gear extending transversely of said body and drivingly engaging said worm wheel.

6. The tool of claim 5 wherein said worm wheel is located on the opposite side of said threaded shank from said head.

7. The tool of claim 5 wherein said shank has an unthreaded shaft portion of non-circular cross-sectional shape, said worm wheel being received on said shaft portion for rotatably driving said shank while providing free longitudinal sliding movement of said shaft portion relative to said worm wheel.

8. The tool of claim 5 including a central serrated drive spigot extending axially from the opposite end of said body, and a ring nut on said body adjacent said opposite end thereof outwardly of said drive spigot for securing said body to an adaptor having a drive socket for receiving said drive spigot.

* * * * *